US011877358B2

(12) United States Patent
Esarey et al.

(10) Patent No.: US 11,877,358 B2
(45) Date of Patent: Jan. 16, 2024

(54) PORTABLE ELECTRIC WARMING SYSTEMS AND METHODS

(71) Applicant: Ignik Outdoors, Inc., Bainbridge Island, WA (US)

(72) Inventors: Graeme Esarey, Bainbridge Island, WA (US); Peter Pontano, Seattle, WA (US)

(73) Assignee: Ignik Outdoors, Inc., Bainbridge Island, WA (US)

( * ) Notice: Subject to any disclaimer, the term of this patent is extended or adjusted under 35 U.S.C. 154(b) by 0 days.

(21) Appl. No.: 18/021,921

(22) PCT Filed: Aug. 25, 2020

(86) PCT No.: PCT/US2020/047848
§ 371 (c)(1),
(2) Date: Feb. 17, 2023

(87) PCT Pub. No.: WO2022/046040
PCT Pub. Date: Mar. 3, 2022

(65) Prior Publication Data

US 2023/0232503 A1 Jul. 20, 2023

(51) Int. Cl.

| | |
|---|---|
| ***H05B 3/34*** | (2006.01) |
| ***A47G 9/02*** | (2006.01) |
| *A47G 9/08* | (2006.01) |
| *H05B 3/14* | (2006.01) |

(52) U.S. Cl.
CPC .......... *H05B 3/347* (2013.01); *A47G 9/0215* (2013.01); *A47G 9/086* (2013.01); *H05B 3/14* (2013.01); *H05B 2203/013* (2013.01); *H05B 2203/032* (2013.01); *H05B 2203/036* (2013.01)

(58) Field of Classification Search
CPC .......... H05B 3/347; H05B 3/14; H05B 3/145; H05B 3/34; H05B 2203/013; H05B 2203/032; H05B 2203/036; A47G 9/0215; A47G 9/086
See application file for complete search history.

(56) References Cited

U.S. PATENT DOCUMENTS

| | | | | |
|---|---|---|---|---|
| 4,303,074 | A | 12/1981 | Bender | |
| 5,017,758 | A * | 5/1991 | Kirkman | H05B 3/34 219/205 |
| 6,007,245 | A | 12/1999 | Looy | |
| 9,693,891 | B2 | 7/2017 | Macintyre-Ellis et al. | |
| 9,696,751 | B2 | 7/2017 | Ueda et al. | |
| 9,867,411 | B2 | 1/2018 | Gallagher | |
| 9,883,550 | B2 | 1/2018 | Comoglio et al. | |
| 10,134,502 | B2 * | 11/2018 | Elverud | H05B 3/145 |
| 10,206,429 | B2 | 2/2019 | Davis et al. | |
| 10,225,886 | B2 | 3/2019 | Sugino | |

(Continued)

FOREIGN PATENT DOCUMENTS

WO WO-2022115501 A1 * 6/2022

*Primary Examiner* — Shawntina T Fuqua
(74) *Attorney, Agent, or Firm* — Kolitch Romano Dascenzo Gates LLC

(57) ABSTRACT

Portable multi-layer warmth delivery systems and methods may pertain to an electrically resistive first layer, a structural second layer, and an infrared-redirecting third layer. By passing an electrical current through the electrically resistive first layer, infrared energy is emitted, redirected, and efficiently concentrated in a vicinity.

21 Claims, 5 Drawing Sheets

(56) References Cited

U.S. PATENT DOCUMENTS

| | | | | |
|---|---|---|---|---|
| 10,332,651 | B2 | 6/2019 | Al-Harthi et al. | |
| 10,379,273 | B2 | 8/2019 | Davis | |
| 10,442,273 | B2 | 10/2019 | Wittkowski et al. | |
| 10,464,680 | B2 | 11/2019 | Kinlen et al. | |
| 10,475,548 | B2 | 11/2019 | Guo et al. | |
| 10,513,616 | B2 | 12/2019 | Jin et al. | |
| 10,518,490 | B2 | 12/2019 | Wicker et al. | |
| 10,549,064 | B2 | 2/2020 | Tang et al. | |
| 10,549,502 | B2 | 2/2020 | Berrang | |
| 10,566,478 | B2 | 2/2020 | Jeong et al. | |
| 10,569,920 | B2 | 2/2020 | Hinman et al. | |
| 10,573,548 | B2 | 2/2020 | Hayashishita | |
| 10,574,175 | B2 | 2/2020 | Hubert et al. | |
| 10,576,697 | B2 | 3/2020 | Beraud et al. | |
| 10,580,638 | B2 | 3/2020 | Jain et al. | |
| 10,585,482 | B2 | 3/2020 | Wen et al. | |
| 10,589,459 | B2 | 3/2020 | Ravich et al. | |
| 10,593,826 | B2 | 3/2020 | Udrea et al. | |
| 2009/0114634 | A1 | 5/2009 | Naylor et al. | |
| 2012/0191164 | A1 | 7/2012 | Gander et al. | |
| 2014/0316494 | A1 * | 10/2014 | Augustine | H05B 3/12<br>607/112 |
| 2016/0143091 | A1 * | 5/2016 | Augustine | H05B 3/342<br>219/528 |
| 2021/0333012 | A1 * | 10/2021 | Smith | H05B 3/141 |

* cited by examiner

PORTABLE ELECTRIC WARMING SYSTEMS AND METHODS

DETAILED DESCRIPTION

Figure 1:
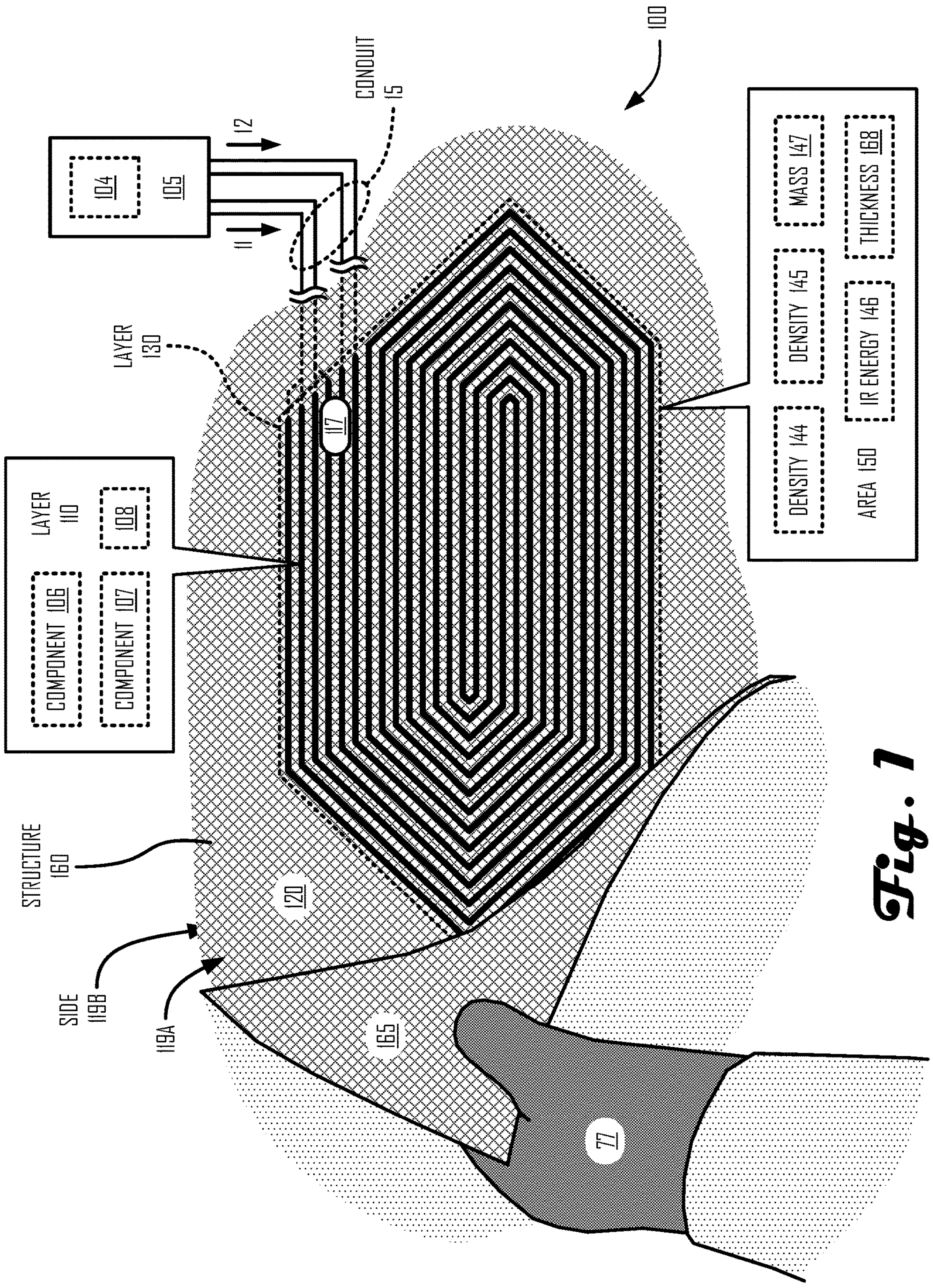
FIG. 1 illustrates an infrared- and visible-spectrum view of a portable system 100 in which one or more technologies may be incorporated.

In the detailed description that follows, the phrases "in one embodiment,""in various embodiments," "in some embodiments," and the like are used repeatedly. Such phrases do not necessarily refer to the same embodiment. The terms "comprising," "having," and "including" are synonymous, unless the context dictates otherwise. As used herein a quantity is "about" a value X only if they differ by less than a factor of 3, unless context dictates otherwise. As used herein two quantities are "on the same order" or "roughly" equal only if they differ by less than a factor of 10, unless context dictates otherwise. As used herein "numerous" means hundreds or more, unless context dictates otherwise. As used herein a structure is "porous" only if it has numerous moisture-permeable pores (i.e. holes smaller than 5 microns in diameter) pervading therethrough. As used herein a "thickness" of a layered structure refers to a distance between opposite sides of opposite primary layers of the structure, notwithstanding additional structures that may be attached or adjacent.

"About," "additional, " "adhesive," "adjacent," "affixed," "alternatively,""applied," "as," "assembled," "at least," "automatic," "averaged," "basically," "between," "by, ""comprising," "configured," "corresponding," "direct," "distal," "downward," "efficiently,""elastic," "electric," "emitted," "essentially," "first," "formed," "frigid," "front," "greater,""having," "herein," "including," "increased," "ineffective," "infrared," "initial," "median,""molecular," "more," "nominal," "occupiable," "of," "onto," "other," "partial," "passed,""portable," "positioned," "redirecting," "reflective," "resistive," "roughly," "second,""separated," "several," "single-piece," "skilled," "so as," "some," "structural," "such,""thereafter," "thereby," "thicker," "through," "triggered," "upon," "warmed," "wearable,""wherein," "within," or other such descriptors herein are used in their normal yes-or-no sense, not merely as terms of degree, unless context dictates otherwise. In light of the present disclosure those skilled in the art will understand from context what is meant by "adjacent" and by other such positional descriptors used herein. "Electrically resistive" is used herein to describe a structure that presents a resistance of roughly 0.5 ohms to (roughly) 500 ohms to a voltage source across it.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an infrared- and visible-spectrum view of a portable system 100 in which one or more technologies may be incorporated. As shown an occupant 77 of a tent or other space is lifting a covering 165 away from a compact multi-layer structure 160 having one or more layered areas 150 configured to emit infrared energy 146 efficiently into the occupied space. In addition to one or more structural layers 120 as shown the area 150 of structure 160 that emits significant infrared energy 146 includes one or more electrically resistive layers 110 each having a serpentine or other pattern of heat-dispersing resistive traces. Behind the one or more electrically resistive layers 110 are one or more infrared-redirecting layers 130 configured to redirect at least some of the rearwardly-directed infrared energy 146 back forward through the one or more electrically resistive layers 110 so as to amplify the effective power density 144. As a result of such redirection even currents 11, 12 (e.g. provided by a button-operated controller 105 operably coupled to a 12-volt battery 104 via conduits 15 as shown) of about 1-5 amperes can provide significant warming even through a low-mass layered area 150 having an thickness 168 of roughly 0.9 millimeters. For example, a mass density 145 of 400 grams per square meter over an area of 500 square centimeters corresponds to a mass 147 of just 20 grams. In some variants a carbon fiber or other resistive component 106 is linked or bonded to other components 107 of each electrically resistive layer 110 such that an aggregate resistance 108 encountered by current passing through area 150 is about 2 ohms.

In some contexts, like a tent interior, one or more structural layers 120 may be positioned adjacent or interspersed with the one or more infrared-redirecting layers 130 so that the electrically resistive first layer(s) 110 may be directly adjacent the occupiable space to be heated. In others, a structural layer 120 thereof may extend between an occupiable space to be heated (e.g. within a wearable article comprising system 100) and the electrically resistive first layer(s) 110, with the latter being sandwiched between the innermost structural layer 120 and an infrared-redirecting layer 130. See also FIGS. 8-9.

As used herein "shelter" may refer to one or more instances of habitations, items of clothing, blankets, shoes, thermal pads, or other structures taken individually or collectively that give protection from cold or moisture. As used herein shelter is "occupiable" if it bounds a space designed to allow (some or all of) a human being to enter for such protection.

As shown the multi-layer warmth delivery structure 160 has a primary side 119A and an (opposite) secondary side 119B and is configured to emit infrared energy 146 efficiently only toward the primary side 119A (e.g. an interior, favored, or "front" side) of the system 100 and not toward the secondary side 119B thereof. Likewise each layer 110, 120, 130 of the multi-layer warmth delivery structure 160 also has a primary side 119A and an (opposite) secondary side 119B thereof. In some variants a sensor unit is installed in the occupiable space (e.g. mounted on a front side 119A of multi-layer structure 160) and is configured to trigger a current reduction (e.g. from a higher current 11 to a lower current 12) as an automatic and conditional response 117 to a detected condition (e.g. signaling a temperature therein reaching a preset threshold).

Figure 2:
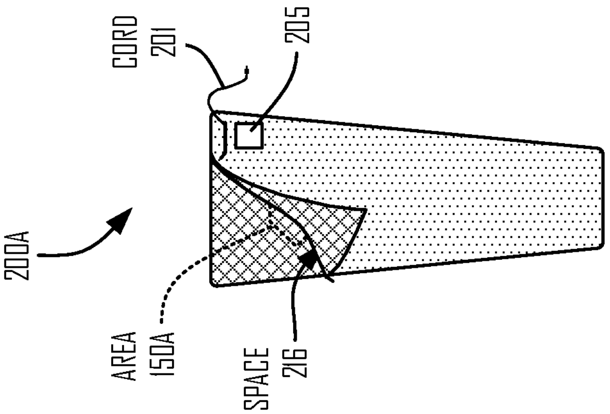
FIG. 2 illustrates a sleeping bag liner system in which one or more technologies may be implemented.

Referring now to FIG. 2, there is shown a sleeping bag liner system 200A in which one or more technologies may be implemented, optionally as an instance of portable system 100 as described herein. A controller 205 thereof may include a battery 104 or may engage an external power source via cord 201. A would-be occupant 77 may insert system 200A into a sleeping bag and select a mode of operation via controller 205. Thereafter a multi-layer structure 160 having one or more active layered areas 250 configured to emit infrared energy 146 efficiently into an occupiable space adjacent each multi-layer structure 160 as described above. Alternatively or additionally, system 200A may implement some or all features as described below with reference to FIG. 8 or 9 (or both).

Figure 3:
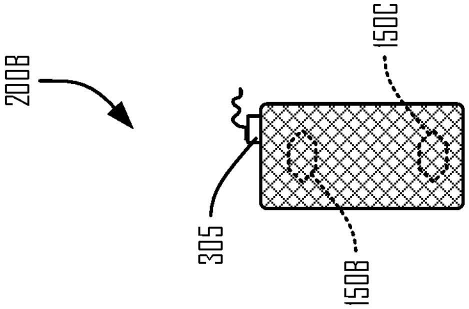
FIG. 3 illustrates a sleeping pad cover system in which one or more technologies may be implemented.

Referring now to FIG. 3, there is shown a sleeping pad cover system 200B in which one or more technologies may be implemented, optionally as an instance of portable system 100 as described herein. A controller 305 thereof may include a battery 104 or may engage an external power source via a cord. A would-be occupant 77 may secure system 200B atop a sleeping pad (e.g. using one or more straps, not shown) and select a mode of operation via controller 305. (An instance of) a multi-layer structure 160 thereof having two active layered areas 150B-C is configured to emit infrared energy 146 efficiently into an occupiable space atop each layered area 150B-C as described above. The two layered areas 150B-C are each of 300 to 3000 square centimeters as shown and separated by more than 10 centimeters spanned by conduits 15. Alternatively or additionally, system 200B may implement some or all features as described below with reference to FIG. 8 or 9.

Figure 4:
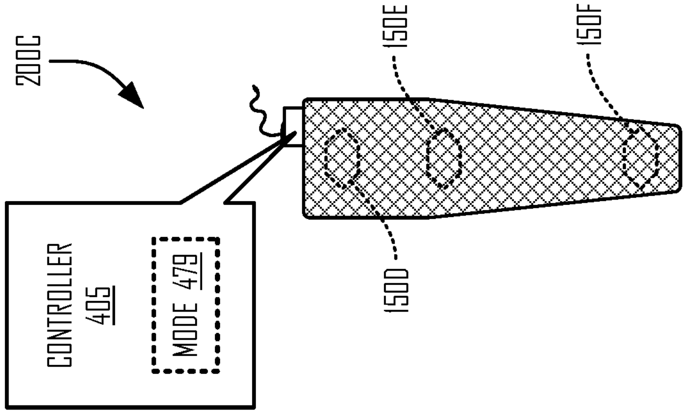
FIG. 4 illustrates another sleeping pad cover system in which one or more technologies may be implemented.

Referring now to FIG. 4, there is shown a tapering sleeping pad cover system 200C in which one or more technologies may be implemented, optionally as an instance of portable system 100 as described herein. A controller 405 thereof may include a battery 104 or may engage a 5-volt or 12-volt power source via a cord as shown. A would-be occupant 77 may secure system 200C atop a sleeping pad and select a mode 479 of operation via controller 405. A multi-layer structure 160 thereof having three layered areas 150D-F is configured to emit infrared energy 146 efficiently into an occupiable space as described above. Multiple respective modes 479 of operation are provided, in some variants, with a respective indicator light on controller 405 signaling which 0-3 of the layered areas 150D-F is currently active (i.e. receiving current 11, 12 and emitting infrared energy 146). Alternatively or additionally, system 200C may implement some or all features as described below with reference to FIG. 8 or 9 (or both).

Figure 5:
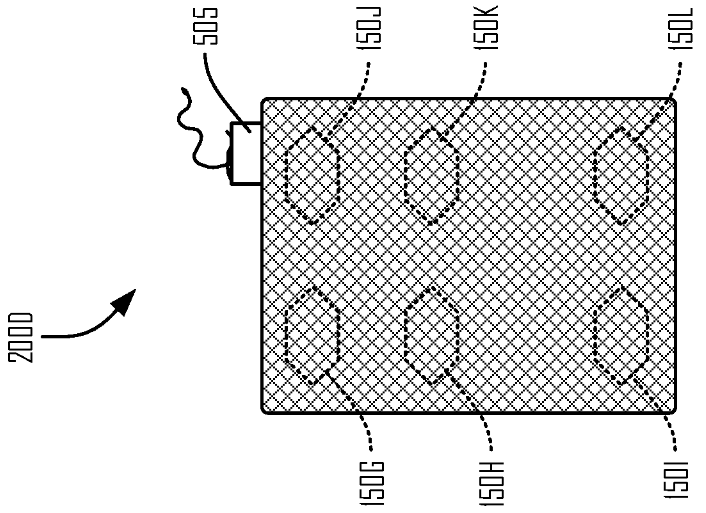
FIG. 5 illustrates another sleeping pad cover system in which one or more technologies may be implemented.

Referring now to FIG. 5, there is shown another sleeping pad cover system 200D in which one or more technologies may be implemented, optionally as an instance of portable system 100 as described herein. A controller 505 thereof may include a battery 104 or may engage a 5-volt or 12-volt power source via a cord as shown. A would-be occupant 77 may secure system 200D atop a sleeping pad and select a mode 479 of operation via controller 505. A multi-layer structure 160 thereof having six layered areas 150G-L is configured to emit infrared energy 146 efficiently into an occupiable space atop each active layered area 150G-L as described above. Multiple respective modes 479 of operation are provided, in some variants, with a respective indicator light on controller 505 signaling which 0-6 of the layered areas 150G-L is currently active. Alternatively or additionally, system 200D may implement some or all features as described below with reference to FIG. 8 or 9.

Figure 6:
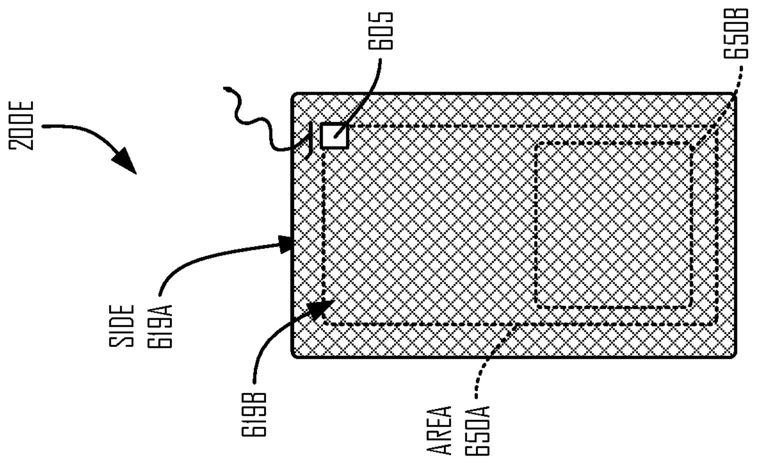
FIG. 6 illustrates a cross-sectional view of a personal warming system in which one or more technologies may be implemented.

Referring now to FIG. 6, there is shown a blanket system 200E in which one or more technologies may be implemented, optionally as an instance of portable system 100 as described herein. A controller 605 thereof may include a battery 104 or may engage a 5-volt or 12-volt power source via a cord as shown. A would-be occupant 77 may occupy a space beneath or within blanket system 200E and select a mode 479 of operation via controller 605. A multi-layer structure 160 thereof having a major activatable area 650A larger than 1 square meter is configured to emit infrared energy 146 efficiently into only one side of the blanket system 200E as described above. Multiple respective modes 479 of operation are provided, in some variants, with a respective indicator light on controller 605 signaling how much energy is being emitted via the layered area 650. In some variants at least one such mode 479 visually signals a compact activatable area 650B at least 25% smaller than the major activatable area 650A. Alternatively or additionally, system 200E may implement some or all features as described below with reference to FIG. 8 or 9 (or both).

As shown system 200E has a primary side 619A and an (opposite) secondary side 619B and is configured to emit infrared energy 146 efficiently only toward the primary side 619A of (an active area 650A-B of) the system 200E and not toward the secondary side 619B thereof. Likewise each layer thereof also has a primary side 619A and an (opposite) secondary side 619B thereof.

Figure 7:
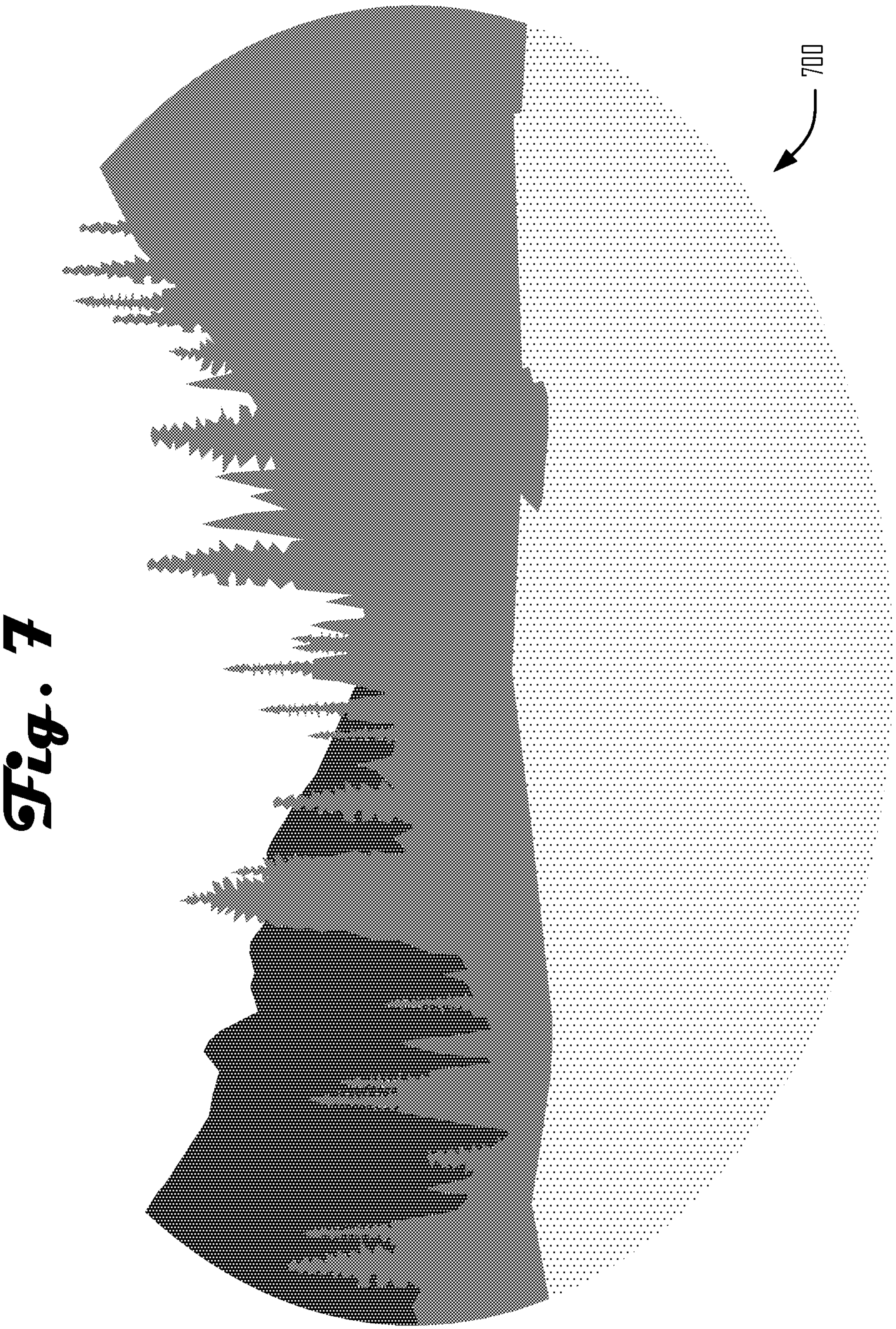
FIG. 7 illustrates a frigid environment in which one or more visitors may be unsafe or uncomfortable because of excessive cold or remote conditions.

Referring now to FIG. 7, there is shown a frigid environment 700 in which one or more visitors may be unsafe or uncomfortable because of excessive cold or remote conditions (or both). As used herein, a "frigid" environment is at or below zero Celsius.

Figure 8:
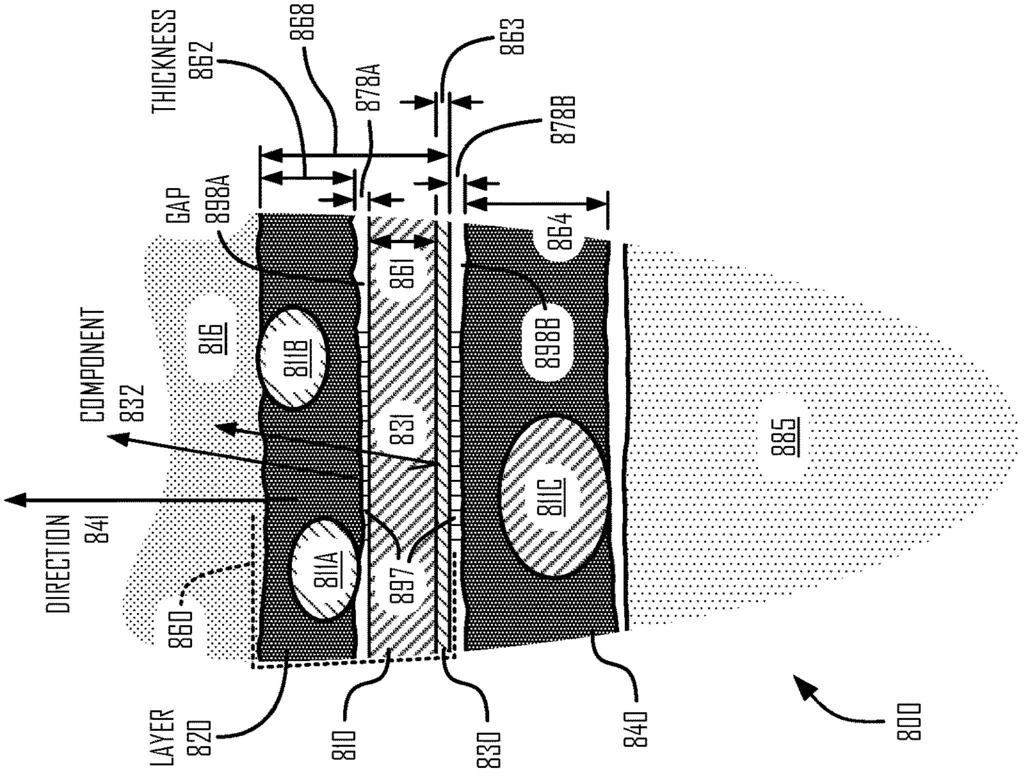
FIG. 8 illustrates a cross-sectional view of a multi-layered system in which one or more technologies may be implemented.

Referring now to FIG. 8, there is shown a cross-sectional view of a multi-layered system 800 in which one or more technologies may be implemented, optionally instantiating one or more of the above-described systems 100, 200A-E. A multi-layer structure 860 thereof is configured to emit infrared energy 146 efficiently into only one side 119A, 619A of the system 800 as shown, an occupiable space 816 in a generally forward direction 841 relative to a layered area 150, 650 as shown. Structure 860 comprises at least an electrically resistive first layer 110, 810; a structural second layer 120, 820, 840; and an infrared-redirecting third layer 130, 830. When current 11, 12 is delivered (e.g. via one or more conduits 15) through layer 110, 810 infrared energy 146 is directionally emitted (e.g. generally forward) as a redirected first component 831 and a non-redirected second component 832 that, as a combination, allow a majority of the infrared energy 146 emitted from the electrically resistive first layer 110, 810 to pass into the occupiable space 816. In some contexts, for example, this may salvage significant energy that would otherwise be wasted warming up a supporting layer 840 or mattress 885.

In some contexts one or more fibers 811A-B of a front-side structural second layer 120, 820 are less than 70 deniers. Alternatively or additionally one or more fibers 811C of a back-side structural layer 840 are greater than 10 denier and less than 100d. In some variants such a multi-layer structure is constructed so that a (nominal or median) thickness 861 of the electrically resistive first layer 110, 810 is about 5-35% of a thickness 868 of the multi-layer warmth delivery structure 160, 860; so that a thickness 862 of the structural second layer 120 is about 20-60% of thickness 868; and so that a thickness 863 of the infrared-redirecting third layer 130 is about 1-10% of the thickness 868 of the multi-layer warmth delivery structure 160, 860.

In some contexts moreover a first fixative 897 couples about 5% to (about) 25% of an area 150, 650 of the electrically resistive first layer 110, 810 with the structural second layer 120 and a remainder of the area 150, 650 of the electrically resistive first layer 110, 810 is separated from the structural second layer 120 by an air gap 898A having an area-averaged gap thickness 878A of roughly 10 to 100 microns. As shown a second fixative 897 couples about 5% to (about) 25% of an area 150, 650 of the infrared-redirecting third layer 130, 830 with a back-side structural layer 840 and a remainder of the area 150, 650 of the infrared-redirecting third layer 130, 830 is separated from the back-side structural layer 840 by an air gap 898B having an area-averaged gap thickness 878B of roughly 10 to 100 microns. Alternatively or additionally, such affixations may be sewn. In which the system 100, 200A-E, 800 would otherwise be unduly heavy or in which an electrically resistive first layer 110, 810 thereof would be damaged in use.

Figure 9:
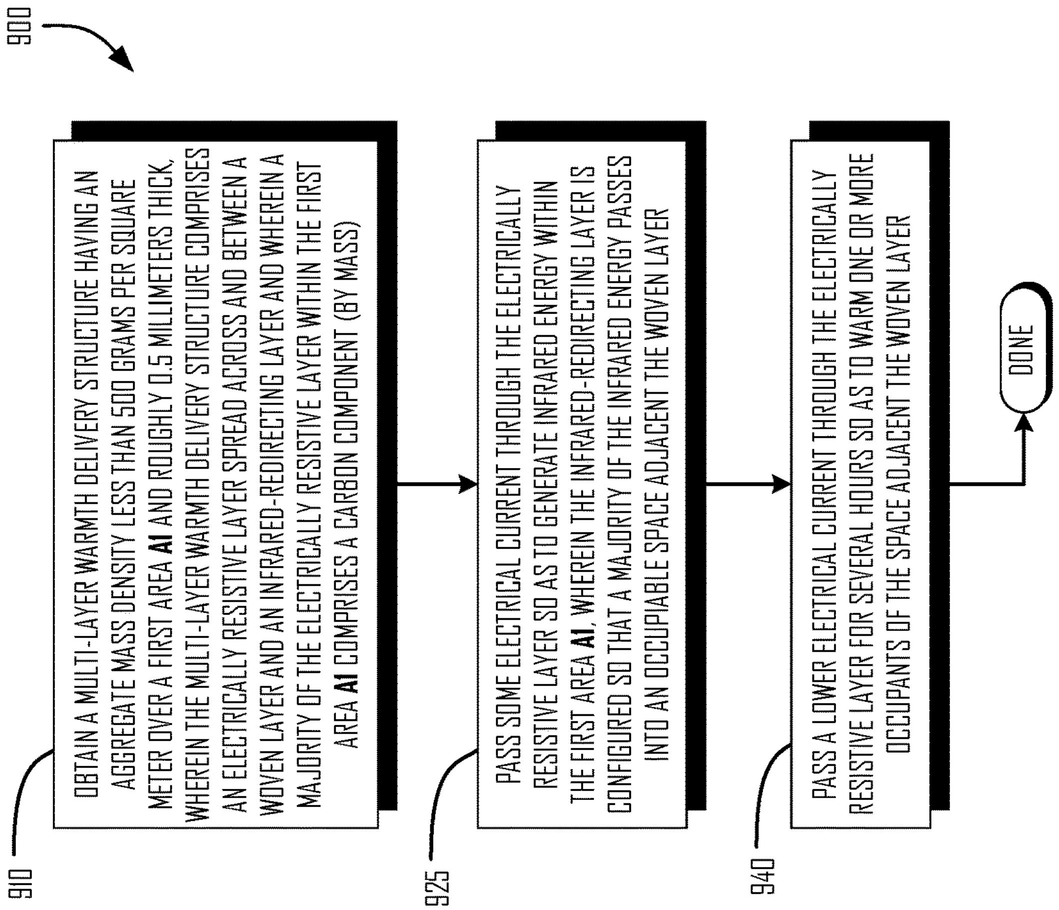
FIG. 9 illustrates a flow chart of operations in which one or more technologies may be implemented.

Referring now to FIG. 9, there is shown task flow 900 in which one or more technologies may be implemented. Operation 910 describes obtaining a multi-layer warmth delivery structure having an aggregate mass density less than 500 grams per square meter over a first area A1 and roughly 0.9 millimeters thick (e.g. a would-be occupant 77 of a tent, sleeping bag, or other system 100 purchasing, assembling, or otherwise obtaining a multi-layer structure 160, 860 having an area 150, 650 of roughly 300 to 3000 square centimeters and an area-averaged mass density 145 less than 500 grams per square meter). This can occur, for example, in a context in which the multi-layer structure 160, 860 comprises at least one electrically resistive "first" layer 110, 810, at least one infrared-redirecting layer 130, 830, and at least one structural layer 120, 820, 840; in which the mass 147 of a carbon component 106 in each electrically resistive layer 110 is greater than that of all other molecular or mixture components 107 thereof combined; and in which "A1" refers to an area 150, 650 of the structure 160, 860 that has a nominal or average thickness 865 of roughly 0.9 millimeters. This can occur, for example, in which other parts of the system 100, 200A-E, 800 can be added or substituted according to a high-comfort or other bulkier specification. Such systems may include additional structural layers 820, 840 to enhance comfort or safety, for example, such as a foam mattress 885.

Operation 925 describes passing some electrical current through the electrically resistive layer so as to generate infrared energy within the first area A1 (e.g. one or more occupants 77 attaching a battery, plugging in a cord 201, or turning on a controller 105, 205, 305, 405, 505, 605 so that one or more currents 11, 12 passing through the electrically resistive layer(s) 110, 810 thereby cause an emission of infrared energy 146 within the first area 150, 650 of the structure 160, 860). This can occur, for example, in a context in which only a negligible amount of resulting infrared energy is artificially emitted (along a cord 201 thereof or otherwise) elsewhere within the system; in which one or more infrared-redirecting layers 130, 830 cause a redirected component 831 of the infrared energy 146 to pass through the woven layer 120, 820; in which the redirected component 831 and a (direct or other) non-redirected second component 832 of the infrared energy 146 (e.g. passing between fibers 811A-B or otherwise directly through 820) together constitute a majority of the infrared energy 146 emitted within the first area 150, 650; and in which the majority of the infrared energy 146 is thereby passed into an occupiable space 816 (e.g. warming one or more occupants 77 thereof). As used herein a percentage is "negligible" only if it is less than 1%, unless context dictates otherwise.

Operation 940 describes passing a lower electrical current through the electrically resistive layer for several hours so as to warm one or more occupants of the space adjacent the woven layer (e.g. one or more occupants 77 causing a less-than-maximum electrical current 12 to pass through the electrically resistive layer 110, 810 for more than three hours so as to warm the space 816). This can occur for example, in a context in which the prior activation of the controller 105, 205, 305, 405, 505, 605 is programmed to reduce a current transmission by more than 25% automatically after several minutes of rapid warming (e.g. by switching off current 11) and in which one or more batteries 104 powering the control would otherwise be ineffective for allowing the one or more occupants 77 to become rested.

In light of teachings herein, numerous existing techniques may be applied for configuring special-purpose optical, assembly, electrical, or other structures and materials as described herein without undue experimentation. See, e.g., U.S. Pat. No. 10,593,826 ("Infra-red devices"); U.S. Pat. No. 10,589,459 ("Method of layerwise fabrication of a three-dimensional object"); U.S. Pat. No. 10,585,482 ("Electronic device having a hybrid conductive coating for electrostatic haptics"); U.S. Pat. No. 10,580,638 ("Multiple barrier layer encapsulation stack"); U.S. Pat. No. 10,576,697 ("Method of applying an intermediate material making it possible to ensure the cohesion thereof, method of forming a stack intended for the manufacture of composite components and intermediate material"); U.S. Pat. No. 10,574,175 ("Energy conversion system with radiative and transmissive emitter"); U.S. Pat. No. 10,573,548 ("Method for manufacturing semiconductor device"); U.S. Pat. No. 10,569,920 ("Linerless adhesive activation"); U.S. Pat. No. 10,566,478 ("Thin-film solar cell module structure and method of manufacturing the same"); U.S. Pat. No. 10,549,502 ("Breathable waterproof stretchable multi-layer foam construct"); U.S. Pat. No. 10,549,064 ("Humidifier and layered heating element"); U.S. Pat. No. 10,518,490 ("Methods and systems for embedding filaments in 3D structures, structural components, and structural electronic, electromagnetic and electromechanical components/devices"); U.S. Pat. No. 10,513,616 ("Sunlight reflecting materials and methods of fabrication"); U.S. Pat. No. 10,475,548 ("Ultra-thin doped noble metal films for optoelectronics and photonics applications"); U.S. Pat. No. 10,464,680 ("Electrically conductive materials for heating and deicing airfoils"); U.S. Pat. No. 10,442,273 ("Heatable interior lining element"); U.S. Pat. No. 10,379,273 ("Apparatus and methods to provide a surface having a tunable emissivity"); U.S. Pat. No. 10,332,651 ("Method for making polyvinyl alcohol/carbon nanotube nanocomposite film"); U.S. Pat. No. 10,225,886 ("Infrared light source"); U.S. Pat. No. 10,206,429 ("Aerosol delivery device with radiant heating"); U.S. Pat. No. 10,134,502 ("Resistive heater"); U.S. Pat. No. 9,883,550 ("Multilayer textile article with an inner heating layer made of an electrified fabric, and respective manufacturing process"); U.S. Pat. No. 9,867,411 ("Adhesive fabrication process for garments and other fabric products"); U.S. Pat. No. 9,696, 751 ("Substrate with transparent electrode, method for manufacturing same, and touch panel"); and U.S. Pat. No. 9,693,891 ("Cost-effective systems and methods for enhanced normothermia"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) An occupant warming system 100, 200A-E, 800 comprising:

a multi-layer warmth delivery structure 160, 860 having a first layered area 150, 650 that comprises at least an electrically resistive first layer 110, 810 and a structural second layer 120, 820, 840 and an infrared-redirecting third layer 130, 830; and one or more conduits 15 configured to pass a first electrical current 11, 12 through one or more electrically resistive layers 110, 810 of the multi-layer warmth delivery structure 160, 860 that include the electrically resistive first layer 110, 810 so as to generate infrared energy 146 within the first layered area 150, 650 of the multi-layer warmth delivery structure 160, 860; wherein the infrared-redirecting third layer 130, 830 causes a redirected first component 831 of the infrared energy 146 to pass through the one or more electrically resistive layers 110, 810 and into an occupiable space 816 not adjacent the infrared-redirecting third layer 830; and wherein the redirected first component 831 and a non-redirected second component 832 of the infrared energy 146 together constitute a majority of the infrared energy 146 emitted within the first layered area 150, 650 of the multi-layer warmth delivery structure 160, 860.

2. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of roughly 10 to (roughly) 50 milliwatts per square centimeter over (a front side 119A, 619A of) the layered area 150, 650.

3. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of roughly 10 milliwatts per square centimeter over the layered area 150, 650.

4. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of about 10 milliwatts per square centimeter over the layered area 150, 650.

5. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of roughly 50 milliwatts per square centimeter over the layered area 150, 650.

6. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of about 50 milliwatts per square centimeter over the layered area 150, 650.

7. The occupant warming system of ANY of the above clauses wherein the non-redirected second component 832 of the infrared energy 146 emitted from the first layered area 150, 650 of the multi-layer warmth delivery structure 160, 860 is configured to provide an aggregate power density 144 of 10 to 50 milliwatts per square centimeter over the layered area 150, 650.

8. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of roughly 15 to (roughly) 75 milliwatts per square centimeter over the layered area 150, 650.

9. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of roughly 15 milliwatts per square centimeter over the layered area 150, 650.

10. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of about 15 milliwatts per square centimeter over the layered area 150, 650.

11. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of roughly 75 milliwatts per square centimeter over the layered area 150, 650.

12. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of about 75 milliwatts per square centimeter over the layered area 150, 650.

13. The occupant warming system of ANY of the above clauses wherein a total infrared energy 146 emitted into the occupiable region 816 from the first layered area 150, 650 of the multi-layer warmth delivery structure 160, 860 is configured to provide an aggregate power density 144 of 15 to 75 milliwatts per square centimeter over the layered area 150, 650.

14. The occupant warming system of Clause 1, wherein the structural second layer 120 is adjacent the electrically resistive first layer 110 but not the infrared-redirecting third layer 130.

15. The occupant warming system of ANY of the above clauses wherein the electrically resistive first layer of the layered area of the multi-layer warmth delivery structure comprises more than 20% carbon by mass (i.e. wherein a mass 147 of a carbon component 206 thereof is more than 20% of a mass 147 of an entirety thereof).

16. The occupant warming system of ANY of the above clauses wherein the electrically resistive first layer of the layered area of the multi-layer warmth delivery structure comprises more than 10% stranded carbon by mass (i.e. wherein a mass 147 of a stranded carbon component 206 thereof is more than 10% of a mass 147 of an entirety thereof).

17. The occupant warming system of ANY of the above clauses wherein a (nominal) thickness 862 of the structural second layer 120, 820 is less than one millimeter.

18. The occupant warming system of ANY of the above clauses wherein a thickness 862 of the structural second layer 120, 820 is at least 10% of a thickness 868 of the warmth delivery structure 860.

19. The occupant warming system of ANY of the above clauses wherein the multi-layer warmth delivery structure 160, 860 has a primary side 119A, 619A and an (opposite) secondary side 119B, 619B thereof and is configured to emit infrared energy 146 efficiently only toward the primary side 119A, 619A (e.g. an interior, favored, or "front" side) of the system and not toward the secondary side 119B, 619B thereof.

20. The occupant warming system of ANY of the above clauses wherein the multi-layer warmth delivery structure 160, 860 has a primary side 119A, 619A and an (opposite) secondary side 119B, 619B and is configured to emit infrared energy 146 efficiently only toward the primary side 119A, 619A (e.g. an interior, favored, or "front" side) of the system and not toward the secondary side 119B, 619B thereof, and wherein each layer of the multi-layer warmth delivery structure 160, 860 also has a primary side 119A, 619A and an (opposite) secondary side 119B, 619B thereof.

21. The occupant warming system of ANY of the above clauses wherein the first electrical current is reduced as an automatic and conditional response 117 in the occupiable space 816 (e.g. indicating a temperature therein reaching a preset threshold).

22. The occupant warming system of ANY of the above clauses wherein a (nominal or median) thickness 861 of the electrically resistive first layer 110 is about 20% of a (nominal or median) thickness 868 of the multi-layer warmth delivery structure 160, 860.

23. The occupant warming system of ANY of the above clauses wherein a (nominal or median) thickness 861 of the electrically resistive first layer 110 is roughly 20% of a (nominal or median) thickness 868 of the multi-layer warmth delivery structure 160, 860.

24. The occupant warming system of ANY of the above clauses wherein a (nominal or median) thickness 862 of the structural second layer 120 is about 30% of a (nominal or median) thickness 868 of the multi-layer warmth delivery structure 160, 860.

25. The occupant warming system of ANY of the above clauses wherein a (nominal or median) thickness 862 of the structural second layer 120 is roughly 30% of a (nominal or median) thickness 868 of the multi-layer warmth delivery structure 160, 860.

26. The occupant warming system of ANY of the above clauses wherein a (nominal or median) thickness 863 of the infrared-redirecting third layer 130 is about 5% of a (nominal or median) thickness 868 of the multi-layer warmth delivery structure 160, 860.

27. The occupant warming system of ANY of the above clauses wherein a (nominal or median) thickness 863 of the infrared-redirecting third layer 130 is roughly 5% of a (nominal or median) thickness 868 of the multi-layer warmth delivery structure 160, 860.

28. The occupant warming system of ANY of the above clauses wherein a fixative 897 couples about 5% to (about) 25% of an area 150, 650 of the electrically resistive first layer 110, 810 with the structural second layer 120 and wherein a remainder of the area 150, 650 of the electrically resistive first layer 110, 810 is separated from the structural second layer 120 by an air gap 898A (e.g. having an area-averaged gap thickness 878A of roughly 10 to 100 microns).

29. The occupant warming system of ANY of the above clauses wherein a fixative 897 couples about 5% to 25% of an area 150, 650 of the infrared-redirecting third layer 130, 830 with a back-side structural layer 840 and wherein a remainder of the area 150, 650 of the infrared-redirecting third layer 130, 830 is separated from the back-side structural layer 840 by an air gap 898B (e.g. having an area-averaged gap thickness 878B of roughly 10 to 100 microns).

30. The occupant warming system of ANY of the above clauses wherein a fixative 897 couples more than half of an area 150, 650 of the electrically resistive first layer 110, 810 with the infrared-redirecting third layer 130, 830.

31. The occupant warming system of ANY of the above clauses wherein at least part of the infrared-redirecting third layer 130, 830 is formed (e.g. as a film or other coating) on a back side of the electrically resistive first layer 110, 810.

32. The occupant warming system of ANY of the above clauses wherein at least an electrically resistive component 106 of the electrically resistive first layer 110, 810 is formed on a front side of the infrared-redirecting third layer 130, 830.

33. The occupant warming system of ANY of the above clauses wherein one or more fibers 811A-B of a front-side structural second layer 120, 820 are less than 70d (denier).

34. The occupant warming system of ANY of the above clauses wherein one or more fibers 811C of a back-side structural layer 840 are greater than 10d and less than 100d.

35. The occupant warming system of ANY of the above clauses wherein the system includes both a back-side structural layer 840 and the structural second layer 120, 820 as a front-side layer, wherein only one of the front-side layer 820 or the back-side layer 840 (but not both) comprises an elastic fabric.

36. The occupant warming system of ANY of the above clauses wherein the structural second layer 120, 820, 840 comprises at least 30% woven fiber 811 by mass.

37. The occupant warming system of ANY of the above clauses wherein the infrared-redirecting third layer 130, 830 causes a redirected first component 831 of the infrared energy 146 to pass through the one or more electrically resistive first layers 110, 810 and through at least the structural second layer 120, 820 and into the occupiable space 816, wherein the occupiable space 816 is not adjacent the infrared-redirecting layer 830.

38. The occupant warming system of ANY of the above clauses wherein the electrically resistive first layer 110, 810 is adjacent (part of) the structural third layer 120, 820.

39. The occupant warming system of ANY of the above clauses wherein the electrically resistive first layer 110, 810 is bound to (part of) the structural third layer 120, 820 with one or more fixatives 897.

40. The occupant warming system of ANY of the above clauses wherein the electrically resistive first layer 110, 810 is adjacent (part of) the structural third layer 120, 820.

41. The occupant warming system of ANY of the above clauses wherein the electrically resistive first layer 110, 810 is bound to (part of) the structural third layer 120, 820 with one or more fixatives 897.

42. The occupant warming system of ANY of the above clauses wherein the multi-layer warmth delivery structure 160, 860 includes one or more other electrically resistive layers 110 adjacent the structural third layer 120, 820.

43. The occupant warming system of ANY of the above clauses wherein the structural third layer 120, 820, 840 is porous.

44. The occupant warming system of ANY of the above clauses wherein the structural third layer 120, 820, 840 primarily comprises woven fibers 811.

45. The occupant warming system of ANY of the above clauses wherein the first layered area 150 comprises a major activatable area 650A larger than 1 square meter, a compact activatable area 650B at least 25% smaller than the major activatable area 650A, and at least first and second modes 479 of operation respectively activating the major or minor area 650A-B.

46. The occupant warming system of ANY of the above clauses wherein the first layered area 150 comprises a major activatable area 650A larger than 1 square meter, a compact activatable area 650B at least 25% smaller than the major activatable area 650A, and at least first and second modes 479 of operation respectively activating the major or minor area 650A-B and wherein a controller 605 thereof selectively signals which one of the areas 650A-B is currently active.

47. The occupant warming system of ANY of the above clauses wherein the first layered area 150 comprises a major activatable area 650A larger than 1 square meter, a compact activatable area 650B less than half as large as the major activatable area 650A, and at least first and second modes 479 of operation respectively activating the major or minor area 650A-B.

48. The occupant warming system of ANY of the above clauses wherein the first layered area 150 comprises a major activatable area 650A larger than 1 square meter, a compact activatable area 650B less than half as large as the major activatable area 650A, and at least first and second modes 479 of operation respectively activating the major or minor area 650A-B and wherein a controller 605 thereof selectively signals which one of the areas 650A-B is currently active.

49. The occupant warming system of ANY of the above clauses wherein the structural third layer 120, 820, 840 primarily comprises a hydrophobic material.

50. The occupant warming system of ANY of the above clauses wherein the multi-layer warmth delivery structure 160, 860 has an average/median thickness 168, 868 of roughly 0.9 millimeters.

51. The occupant warming system of ANY of the above clauses wherein the multi-layer warmth delivery structure 160, 860 has an average/median thickness 168, 868 of about 0.9 millimeters.

52. The occupant warming system of ANY of the above clauses wherein the multi-layer warmth delivery structure 160, 860 has an average/median thickness 168, 868 of 50 to 500 microns.

53. The occupant warming system of ANY of the above clauses wherein the first layered area 150 and a second layered area 150 are each roughly 300 to (roughly) 3000 square centimeters and separated by more than 10 centimeters (as shown in FIGS. 3-5).

54. The occupant warming system of ANY of the above clauses wherein the multi-layer warmth delivery structure 160, 860 has the first and a second layered areas 150 each of roughly 300 to (roughly) 3000 square centimeters and separated by more than 10 centimeters (as shown in FIGS. 3-5).

55. The occupant warming system of ANY of the above clauses wherein the multi-layer warmth delivery structure 160, 860 has the first and a second layered areas 150 each of about 300 to (about) 3000 square centimeters and separated by more than 10 centimeters (as shown in FIGS. 3-5).

56. The occupant warming system of ANY of the above clauses wherein the first layered area 150, 650 is roughly 300 square centimeters.

57. The occupant warming system of ANY of the above clauses wherein the first layered area 150, 650 is about 3000 square centimeters.

58. The occupant warming system of ANY of the above clauses wherein the first layered area 150, 650 is larger than 300 square centimeters and smaller than 3000 square centimeters square centimeters.

59. The occupant warming system of ANY of the above clauses wherein the multi-layer warmth delivery structure 160, 860 has an average mass density 145 less than 500 grams per square meter over the first layered area 150, 650.

60. The occupant warming system of ANY of the above clauses wherein the multi-layer warmth delivery structure 160, 860 has an average mass density 145 less than 200 grams per square meter over the first layered area 150, 650.

61. The occupant warming system of ANY of the above clauses wherein a mass 147 of a carbon component 106 in the first layered area 150, 650 is greater than that of all other molecular or mixture components 107 thereof combined.

62. The occupant warming system of ANY of the above clauses wherein the first layered area 150, 650 is more than 20% carbon by mass.

63. The occupant warming system of ANY of the above clauses wherein the first layered area 150, 650 is more than 10% carbon by mass.

64. The occupant warming system of Clause 1, wherein the electrically resistive first layer 110 presents a resistance 108 of about 1 ohm to (about) 20 ohms to the first electrical current 11, 12.

65. The occupant warming system of Clause 1, wherein the electrically resistive first layer 110 presents a resistance 108 of more than 0.5 ohms to the first electrical current 11, 12.

66. The occupant warming system of Clause 1, wherein the electrically resistive first layer 110 presents a resistance 108 of more than 1 ohm to the first electrical current 11, 12.

67. The occupant warming system of Clause 1, wherein the electrically resistive first layer 110 presents a resistance 108 of more than 2 ohms to the first electrical current 11, 12.

68. The occupant warming system of Clause 1, wherein the electrically resistive first layer 110 presents a resistance 108 of less than 5 ohms to the first electrical current 11, 12.

69. The occupant warming system of Clause 1, wherein the electrically resistive first layer 110 presents a resistance 108 of less than 10 ohms to the first electrical current 11, 12.

70. The occupant warming system of Clause 1, wherein the electrically resistive first layer 110 presents a resistance 108 of less than 20 ohms to the first electrical current 11, 12.

71. The occupant warming system of ANY of Clauses 1 to 70 above wherein the occupant warming system comprises a sleeping bag liner system 200A.

72. The occupant warming system of ANY of Clauses 1 to 70 above wherein the occupant warming system comprises a sleeping pad cover system 200B-C.

73. The occupant warming system of ANY of Clauses 1 to 70 above wherein the occupant warming system comprises a mattress cover system 200D.

74. The occupant warming system of ANY of Clauses 1 to 70 above wherein the occupant warming system comprises a blanket system 200E.

75. The occupant warming system of ANY of Clauses 1 to 70 above wherein the occupant warming system comprises boot or other wearable (instance of a) system 100, 800.

76. The occupant warming system of ANY of Clauses 1 to 70 above wherein the occupant warming system comprises a tent or other portable shelter system 100, 800.

77. The occupant warming system of ANY of Clauses 1 to 70 above wherein the first electrical current 11, 12 is supplied via one or more batteries 104.

78. The occupant warming system of ANY of the above clauses configured to be used according to Clause 79.

79. (Independent) An occupant warming method (e.g. such as that of FIG. 9), comprising:

obtaining a multi-layer warmth delivery structure 160, 860 having a first layered area 150, 650 that comprises at least an electrically resistive first layer 110, 810 and a structural second layer 120, 820, 840 and an infrared-redirecting third layer 130, 830; and using one or more conduits 15 so as to pass a first electrical current 11, 12 through one or more electrically resistive layers 110, 810 of the multi-layer warmth delivery structure 160, 860 that include the electrically resistive first layer 110, 810 so as to generate infrared energy 146 within the first layered area 150, 650 of the multi-layer warmth delivery structure 160, 860; wherein the infrared-redirecting third layer 130, 830 causes a redirected first component 831 of the infrared energy 146 to pass through the one or more electrically resistive layers 110, 810 and into an occupiable space 816 not adjacent the infrared-redirecting third layer 830; and wherein the redirected first component 831 and a non-redirected second component 832 of the infrared energy 146 together constitute a majority of the infrared energy 146 emitted within the first layered area 150, 650 of the multi-layer warmth delivery structure 160, 860.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A portable occupant warming system for use in a frigid climate, comprising:

a multi-layer warmth delivery structure having an aggregate mass density less than 500 grams per square meter and an average thickness of roughly 0.9 millimeters both across a first layered area thereof of roughly 300 to 3000 square centimeters, wherein said first layered area of said multi-layer warmth delivery structure comprises at least an electrically resistive first layer, a structural second layer comprising numerous fibers, and an infrared-redirecting third layer;

one or more conduits configured to pass a first electrical current through at least said electrically resistive first layer so as to generate infrared energy within said first layered area of said multi-layer warmth delivery structure, wherein said infrared-redirecting third layer is configured to cause a redirected first component of said infrared energy within said first layered area to pass through said electrically resistive first layer, through said structural second layer, and into an occupiable space adjacent said multi-layer warmth delivery structure, wherein said redirected first component and a non-redirected second component of said infrared energy passing into said occupiable space adjacent said multi-layer warmth delivery structure together constitute a majority of said infrared energy emitted from said multi-layer warmth delivery structure, and whereby said majority of said infrared energy emitted from said multi-layer warmth delivery structure is configured to warm said occupiable space; and wherein said structural second layer comprises at least 30% fiber by mass and wherein said non-redirected second component of said infrared enemy emitted from said first layered area of said multi-layer warmth delivery structure is configured to provide an aggregate power density of roughly 20 milliwatts per square centimeter emitted over said first layered area into said occupiable space.

2. The portable occupant warming system of claim 1, wherein a thickness of said electrically resistive first layer is about 30% of a thickness of said multi-layer warmth delivery structure, wherein a thickness of said structural second layer is about 30% of said thickness of said multi-layer warmth delivery structure, and wherein a thickness of said infrared-redirecting third layer is roughly 5% of the thickness of said multi-layer warmth delivery structure.

3. The portable occupant warming system of claim 1, wherein at least a part of said infrared-redirecting third layer is formed as a coating on a side of said electrically resistive first layer and wherein said electrically resistive first layer of said first layered area of said multi-layer warmth delivery structure comprises more than 10% carbon by mass.

4. A portable occupant warming system for use in a frigid climate, comprising:

a multi-layer warmth delivery structure having an aggregate mass density less than 500 grams per square meter and an average thickness of roughly 0.9 millimeters both across a first layered area thereof of roughly 300 to 3000 square centimeters, wherein said first layered area of said multi-layer warmth delivery structure comprises at least an electrically resistive first layer, a structural second layer comprising numerous fibers, and an infrared-redirecting third layer;

one or more conduits configured to pass a first electrical current through at least said electrically resistive first layer so as to generate infrared energy within said first layered area of said multi-layer warmth delivery structure, wherein said infrared-redirecting third layer is configured to cause a redirected first component of said infrared energy within said first layered area to pass through said electrically resistive first layer, through said structural second layer, and into an occupiable space adjacent said multi-layer warmth delivery structure, wherein said redirected first component and a non-redirected second component of said infrared energy passing into said occupiable space adjacent said multi-layer warmth delivery structure together constitute a majority of said infrared energy emitted from said multi-layer warmth delivery structure, and whereby said majority of said infrared energy emitted from said multi-layer warmth delivery structure is configured to warm said occupiable space; and wherein said structural second layer is positioned on a first side of said multi-layer warmth delivery structure adjacent said occupiable space, wherein said numerous fibers of said structural second layer are less than 70 d (denier), wherein a structural fourth layer is affixed to a second side of said multi-layer warmth delivery structure opposite said first side, and wherein said structural fourth layer comprises numerous fibers that are greater than 10 d and less than 100 d.

5. The portable occupant warming system of claim 1, wherein said infrared-redirecting third layer causes the redirected first component of said infrared energy to pass through at least said structural second layer and through one or more electrically resistive layers including said electrically resistive first layer and into said occupiable space, wherein said occupiable space is not adjacent said infrared-redirecting third layer.

6. An occupant warming system, comprising:

a multi-layer warmth delivery structure having an average thickness of roughly 0.9 millimeters over a first layered area thereof, wherein said first layered area of said multi-layer warmth delivery structure comprises at least an electrically resistive first layer, a structural second layer, and an infrared-redirecting third layer;

one or more conduits configured to pass a first electrical current through at least said electrically resistive first layer so as to generate infrared energy within said first layered area of said multi-layer warmth delivery structure, wherein said infrared-redirecting third layer is configured to cause a redirected first component of said infrared energy within said first layered area to pass through said electrically resistive first layer, and into an occupiable space adjacent said multi-layer warmth delivery structure and wherein said redirected first component and a non-redirected second component of said infrared energy passing into said occupiable space adjacent said multi-layer warmth delivery structure together constitute a majority of said infrared energy emitted from said multi-layer warmth delivery structure; and a support layer more than three times larger than said first layered area of said multi-layer warmth delivery structure and configured to be unable to receive said first electrical current, wherein said support layer includes and extends beyond said structural second layer but does not include said electrically resistive first layer and does not include said infrared-redirecting third layer.

7. The occupant warming system of claim 6, wherein a thickness of said electrically resistive first layer is about 30% of a thickness of said multi-layer warmth delivery structure, wherein a thickness of said structural second layer is about 30% of said thickness of said multi-layer warmth delivery structure, and wherein a thickness of said infrared-redirecting third layer is roughly 5% of the thickness of said multi-layer warmth delivery structure.

8. The occupant warming system of claim 6, wherein said structural second layer is positioned on a first side of said multi-layer warmth delivery structure adjacent said occupiable space, wherein a structural fourth layer is affixed to a second side of said multi-layer warmth delivery structure, and wherein only one of said structural second layer or said structural fourth layer comprises an elastic fabric.

9. The occupant warming system of claim 6, wherein a total infrared energy emitted into said occupiable space from said first layered area of said multi-layer warmth delivery structure is configured to provide an aggregate power density of infrared energy of about 20 milliwatts per square centimeter over said first layered area.

10. The occupant warming system of claim 6, wherein said first layered area is roughly 300 to 3000 square centimeters and wherein said multi-layer warmth delivery structure has an aggregate mass density less than 500 grams per square meter over said first layered area.

11. The occupant warming system of claim 6, wherein a mass of a stranded carbon component of said electrically resistive first layer of said first layered area of said multi-layer warmth delivery structure is more than 10% of a mass of an entirety of said electrically resistive first layer of said first layered area of said multi-layer warmth delivery structure.

12. The occupant warming system of claim 6, wherein said structural second layer is adjacent said occupiable space and wherein said structural second layer comprises numerous woven fibers.

13. The occupant warming system of claim 6, wherein the electrically resistive first layer presents a resistance of about 1 to 20 ohms to said first electrical current, wherein said electrically resistive first layer of said first layered area of said multi-layer warmth delivery structure comprises more than 10% carbon by mass, and wherein said first electrical current is supplied via one or more batteries.

14. The occupant warming system of claim 6, wherein said multi-layer warmth delivery structure has an aggregate mass density less than 500 grams per square meter and said average thickness of roughly 0.9 millimeters both respectively across said first layered area thereof, wherein said occupant warming system includes another multi-layer warmth delivery structure having an average thickness of roughly 0.9 millimeters over a second layered area; wherein said first and second layered areas are each of roughly 300 to 3000 square centimeters; wherein said first and second layered areas are separated by more than 10 centimeters.

15. The occupant warming system of claim 6, comprising at least one of a sleeping bag liner system, a sleeping pad cover system, or a blanket system, wherein a thickness of said electrically resistive first layer is about 30% of a thickness of said multi-layer warmth delivery structure.

16. An occupant warming method utilizing the occupant warming system of claim 6, the occupant warming method comprising:

using the one or more conduits to pass the first electrical current through at least said electrically resistive first layer so as to generate the infrared energy within said first layered area of said multi-layer warmth delivery structure, wherein said infrared-redirecting third layer is configured to cause the redirected first component of said infrared energy within said first layered area to pass through said electrically resistive first layer, and into the occupiable space adjacent said multi-layer warmth delivery structure and wherein said redirected first component and the non-redirected second component of said infrared energy passing into said occupiable space adjacent said multi-layer warmth delivery structure together constitute the majority of said infrared energy emitted from said multi-layer warmth delivery structure.

17. The occupant warming method of claim 16, comprising:

using at least one of said one or more conduits to pass a smaller second electrical current through said electrically resistive first layer so as to generate a longer-lasting infrared energy within said first layered area of said multi-layer warmth delivery structure after several minutes of faster warming with said first electrical current, wherein said smaller second electrical current is at least 25% smaller than said first electrical current.

18. The portable occupant warming system of claim 1, comprising:

a support layer more than three times larger than said first layered area of said multi-layer warmth delivery structure and configured to be unable to receive said first electrical current, wherein said support layer includes and extends beyond said structural second layer but does not include said electrically resistive first layer and does not include said infrared-redirecting third layer.

19. The portable occupant warming system of claim 1, comprising at least one of a sleeping bag liner system, a sleeping pad cover system, or a blanket system, wherein a thickness of said electrically resistive first layer is about 30% of a thickness of said multi-layer warmth delivery structure.

20. An occupant warming method utilizing the portable occupant warming system of claim 1, the occupant warming method comprising:

using the one or more conduits to pass the first electrical current through at least said electrically resistive first layer so as to generate the infrared energy within said first layered area of said multi-layer warmth delivery structure, wherein said infrared-redirecting third layer is configured to cause the redirected first component of said infrared energy within said first layered area to pass through said electrically resistive first layer, and into the occupiable space adjacent said multi-layer warmth delivery structure, and wherein said redirected first component and the non-redirected second component of said infrared energy passing into said occupiable space adjacent said multi-layer warmth delivery structure together constitute the majority of said infrared energy emitted from said multi-layer warmth delivery structure.

21. The occupant warming method of claim 20, comprising:

using at least one of said one or more conduits to pass a smaller second electrical current through said electrically resistive first layer so as to generate a longer-lasting infrared energy within said first layered area of said multi-layer warmth delivery structure after several minutes of faster warming with said first electrical current, wherein said smaller second electrical current is at least 25% smaller than said first electrical current.

* * * * *